United States Patent [19]

Slaten

[11] 4,441,179

[45] * Apr. 3, 1984

[54] OPTICAL VIDEO DISC STRUCTURE

[75] Inventor: Gary G. Slaten, Fountain Valley, Calif.

[73] Assignee: Discovision Associates, Costa Mesa, Calif.

[ * ] Notice: The portion of the term of this patent subsequent to Jan. 12, 1998 has been disclaimed.

[21] Appl. No.: 322,500

[22] Filed: Jun. 19, 1981

Related U.S. Application Data

[63] Continuation of Ser. No. 3,148, Jan. 15, 1979, Pat. No. 4,310,919.

[51] Int. Cl.$^3$ .......................... G11B 7/24; H04N 5/85
[52] U.S. Cl. .................................. 369/275; 369/286; 369/94; 369/111; 358/342; 346/137; 346/135.1
[58] Field of Search ................. 369/275, 94, 283, 286, 369/111; 365/120; 358/342; 346/135.1, 137; 428/913

[56] References Cited

U.S. PATENT DOCUMENTS

| | | | |
|---|---|---|---|
| 3,430,966 | 3/1969 | Gregg | 369/111 |
| 3,855,426 | 12/1974 | Bouwhuis | 369/111 |
| 4,020,278 | 4/1977 | Carre | 369/275 |
| 4,023,185 | 5/1977 | Bloom | 369/45 |
| 4,090,031 | 5/1978 | Russell | 369/94 |
| 4,125,654 | 11/1978 | Kaneko | 369/288 |
| 4,126,726 | 11/1978 | Soeding | 369/275 |
| 4,188,433 | 2/1980 | Dijkstra | 369/275 |
| 4,313,188 | 1/1982 | Bartolini | 369/275 |

FOREIGN PATENT DOCUMENTS 1446009  8/1976  United Kingdom ................ 369/111

OTHER PUBLICATIONS

Handbook of Adhesives, 2nd ed., by I. Skeist, p. 297, ©1977.

Primary Examiner—Alan Faber
Attorney, Agent, or Firm—Ronald J. Clark

[57] ABSTRACT

A symmetrical video disc structure and method for making the structure are described. The video disc structure is symmetrical about a plane passing through a core member and equidistant and parallel to a first information bearing surface and a second information bearing surface carried by the core. First and second reflective layers are formed over the first and second information bearing surfaces, respectively. The combination of two reflective layers, so oriented, operates as a vapor barrier for preventing the absorptions of water into the core member of the symmetrical video disc structure situated between the two vapor barriers. First and second protective layers are formed over the first and second reflective layers, respectively. The thickness of the first and the second protective layers is maintained the same over the entire area of the video disc structure. The use of protective layers of the same thickness in combination with the vapor barriers employed for isolating a cental core, provides a video disc structure in which the moisture absorption ratio is balanced to avoid warpage.

2 Claims, 16 Drawing Figures

FIG. 1a. VIDEO DISC PLAYER (PRIOR ART)

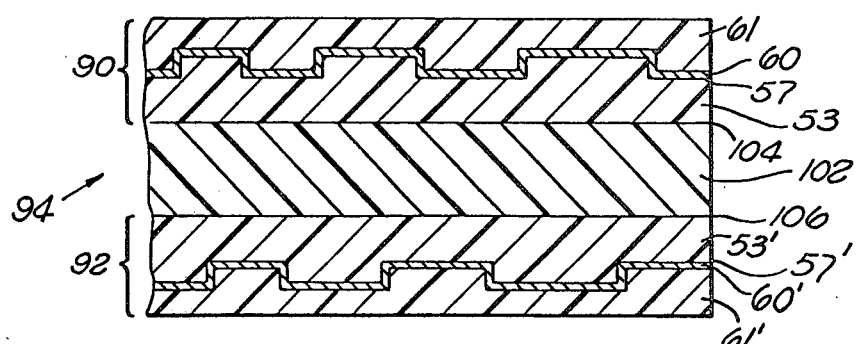
FIG. 9
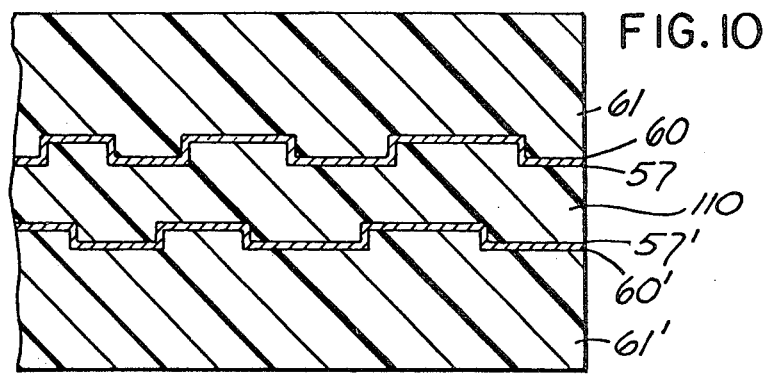
FIG. 10
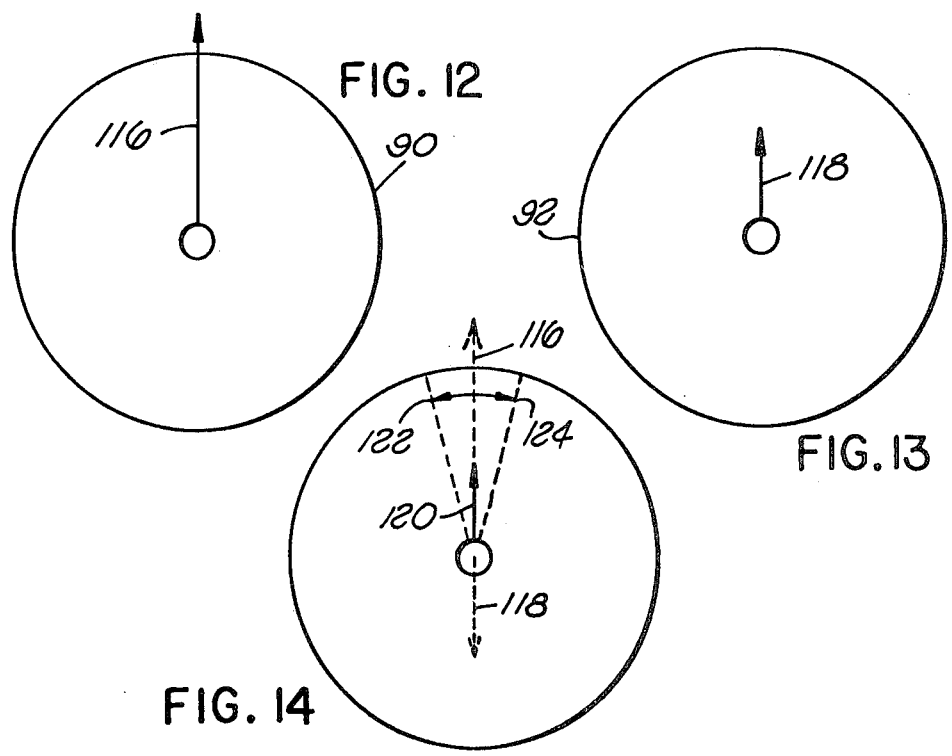
FIG. 12
FIG. 13
FIG. 14

OPTICAL VIDEO DISC STRUCTURE

This is a continuation of application Ser. No. 003,148, filed Jan. 15, 1979, and now U.S. Pat. No. 4,310,919.

BACKGROUND OF THE INVENTION

1. Field of the Invention

The present invention relates to video discs and, more particularly, to a composite video disc structure having symmetry about its central plane for improving resistance to warping and curling in the presence of changing environmental conditions especially heat and humidity.

2. Description of the Prior Art

Video disc structures are described in U.S. Pat. No. 4,225,873 to Winslow. A video disc structure is also described by John Holmes in his patent application entitled "Video Disc Composition and Method for Molding" filed Aug. 28, 1978, Ser. No. 937,221, now abandoned, and assigned to the assignee of the present invention.

Each of these video disc structures is identified as a nonsymmetrical disc. The nonsymmetrical nature of the video disc arises from the fact that a substrate member carries an information bearing layer on one surface thereof. In the Winslow application, Ser. No. 890,407, now U.S. Pat. No. 4,225,873, a glass substrate member is provided. In the environment to be described hereinafter, the glass member does not absorb water nor does it substantially distort in the relatively low temperatures that will be discussed hereinafter.

The John Holmes application Ser. No. 937,221, now abandoned, describes a videodisc member comprising a plastic substrate with an information bearing layer carried on one side of the substrate. A metallized coating covers the information bearing layer. A protective coating is formed on top of the metallized layer. The Holmes prior art structure is referred to as a nonsymmetrical video disc structure because of the substantially greater thickness of the substrate body when compared to the protective overcoat. Additionally, no portion of the structure is isolated between first and second metal coatings. In the Holmes structure, moisture enters simultaneously into both the substrate and the protective coating. During the moisture absorption process, the single metallized layer detrimentally acts as a vapor barrier and prevents moisture absorption equilibrium by isolating the two water vapor absorbing members on each side of the metallized layer. Significantly more water is absorbed into the substrate member than into the overcoat member because of the relative greater thickness of the substrate member. Because of this difference in water vapor content on each side of the metallized coating, the video disc structure tends to warp during the period of absorption into an umbrella shape with the top portion of the umbrella represented by the thick plastic layer. When equilibrium in moisture content is reached on each side of the metallized layer, no warping occurs unless a plastic flow or other similar stress event is caused to happen.

Transmissive recording discs which carry recordings on two surfaces are described in U.S. Pat. Nos. 3,430,966 and 3,518,442 assigned to the assignee of the present application. These differ in many respects with the structure hereinafter described and claimed. Some of the differences between the prior art structure and the improved structure hereinafter described include the use of information tracks formed by members lying in alternate planes. Such information tracks are formed on each major surface of a central core member. A reflective metal coating is formed over each surface carrying the information tracks for providing not only a reflective surface for the impinging reading beam, but also for acting as a barrier about the central core to control the rate of moisture into and out of the core member.

SUMMARY OF THE INVENTION

A symmetrical video disc structure is described having a first and second information bearing layer in combination with a substrate. The substrate is divided by a central plane lying parallel with the first and second information bearing surfaces of the video disc structure. The final video disc structure is symmetrical about this central plane.

The recorded information is arranged in track-like fashion on each of the information bearing surfaces. Alternate reflective and nonreflective indicia are successively postioned in each information track. In the preferred embodiment, the light reflective indicia is represented by a planar shape portion while the light nonreflective region is represented by a bump or raised portion. Each bump has an upper surface lying in a second plane in common with all other upper surfaces of all bumps. The bumps are provided with a flat top surface member in one embodiment.

The video disc structures are made symmetrical about the central plane in order to provide the discs with identical rates of moisture transferred in and out of the substrate member. This avoids the prior art problem wherein the prior art was found to be more affected by humidity and moisture on that side spaced from the reflective coating than on the overcoat layer covering the reflective surface.

The composite video disc structure is fabricated in a number of individual and different embodiments. In a first embodiment, a pair of prior art video disc members are bonded together to form the composite disc structure. Each prior art disc comprises a substrate member which is of relatively thick dimension with an information bearing layer positioned on one surface. The information bearing surface is covered with a reflective film. The reflective film is covered with a protective overcoat. In the composite video disc structure, the overcoat layers are bonded together to form a symmetrical video disc structure. Symmetry is achieved about the glue line or bond plane.

In this embodiment, each individual video disc member is preferably oriented to the other video disc for minimizing the imbalance vector of the composite video disc structure.

In a separate embodiment of the symmetrical composite video disc structure, a relatively thin substrate member is formed with a first information bearing layer on one side of the substrate and a second information bearing layer on the other side of the substrate. Each of the information bearing layers is covered with a reflective film. The reflective film is covered with a substantially uniform protective layer. The protective layer in this embodiment is relatively thick lying within the range of 0.1 MM to 1.25 MM. A preferred thickness for each protective layer is 1.1 MM. The protective layer in this embodiment is required to be a material having a substantially uniform and low value of birefringence throughout the entire body of the disc. The reason is that the reading beam passes through this protective overcoat in this embodiment. A substantially uniform value of birefringence ensures that the reading beam possesses a sufficiently high signal to noise ratio to ensure high fidelity recovery of the frequency modulated information signal stored in the information bearing layer.

In another embodiment, a pair of stampers, each containing program information is accurately located within the cavity of an injection molding machine. A suitable thermal plastic material can be utilized without regard for its optical characteristics. The material should flow readily and set up with a minimum of distortion so that the surface discontinuities representing information will be faithfully reproduced from the stampers. Care is taken not to alter the surface of the disc as it is separated from the molding machine. Because the plastic can be selected solely for the fidelity of reproduction of the tooling without regards to its optical properties, a relatively thin disc may be injection molded.

Using conventional metal coating techniques such as sputtering or vapor deposition, a relatively thin reflective layer is applied to each side of the thin information disc. In a first embodiment, a casting process is utilized to apply a relatively thick protective layer to both surfaces of the disc. The casting process may employ a plastic material having the desired optical qualities of high transparencies and uniform low birefringence. A protective layer of approximately 1.0 MM thickness is preferred. Such a layer would keep surface scratches and contamination substantially isolated from the focal plane when employed in combination with the reading optics currently in use. A liquid injection molding process can also be used to form the protective layer in this embodiment.

In a further embodiment, a central core member is used as a substrate for the casting of a first information layer on one side of the core and a second information layer on the opposite side of the core. A metallizing step forms a reflective coating on both information layers. A protection layer is provided for both surfaces as in the earlier embodiment. Such protective layers are either cast in place or suitable transparent layers are bonded for forming the unitary symmetrical composite disc.

In a further embodiment, the symmetrical composite video disc member is formed by the bonding together of two prior art video disc members. The bonding step occurs while the overcoat layers are still tacky. The pressing together of each overcoat layer provides sufficient adhesive for bonding the composite symmetrical video disc member into a single member. In the embodiment just described, additional bonding or adhesive material can be added while the overcoat members are still tacky for ensuring a permanent and strong bond. This bond must be formed not to exceed a thickness of 25 microns. In the event the thickness of the bond exceeds such maximum, warpage is apt to occur. A suitable adhesive is identified as Pliobond manufactured by the Goodyear Company. Pliobond is a stable colloidal dispersion of Neoprene Type AH in an aliphatic solvent such as heptane. A sprayable contact adhesive formulation also contains a small amount of resin and lesser amounts of other constituents as described by Irving Skeist in his publication entitled "Handbook of Adhesives." The fact that the neoprene is dispersed, rather than dissolved as in other contact adhesives, permits use of a solvent which is relatively inert toward PMMA.

In a further embodiment, a rigid stiffening member is placed between two prior art structures. In this embodiment each bond must be formed less than 25 microns thick.

In a still further embodiment, a Mylar web is used as a carrier for the adhesive. The web is preferrably less than 12.5 microns thick and each layer of adhesive is less than 6 microns thick. This results in a bond having a total thickness less than 25 microns.

The foregoing and other objects, features and advantages of the invention will be apparent from the following more particular description of a preferred embodiment of the invention, as illustrated in the accompanying drawings.

BRIEF DESCRIPTION OF THE FIGURES

FIG. 1a is a block diagram of a prior art video disc player showing the relationship of the video disc with the remainder of the electronics used in the player;

FIG. 1b shows a greatly enlarged, schematic view of a portion of the video disc shown in FIG. 1a;

FIG. 2 is a partial sectional and perspective view of a video disc structure shown in FIG. 1a;

FIG. 3 is an enlarged view of a portion of the surface of the video disc member shown in FIG. 1a;

FIG. 4 shows a radial cross-sectional view taken along the line 4—4 of the video disc shown in FIG. 2 and includes a side elevational view of the objective lens shown in FIG. 1a;

FIG. 9 shows a radial cross-sectional view of a composite video disc structure formed by employing a core member with individual video disc structures bonded to each major surface of the core member;

FIG. 10 shows a radial cross-sectional view of a symmetrical composite video disc structure employing a thin substrate member having an information bearing surface formed on each of the major surfaces of the substrate core member and a relatively thick optical layer attached over each information bearing surface;

FIG. 12 is a schematic view of a first video disc member having a first imbalance vector;

FIG. 13 shows a schematic view of a second video disc member having a second imbalance vector;

FIG. 14 shows a schematic view of a composite video disc member formed by the bonding together of the video disc members shown in FIGS. 8 and 9, and the resulting imbalance vector formed thereby.

DETAILED DESCRIPTION OF THE SHOWN EMBODIMENTS

Figure 1B:
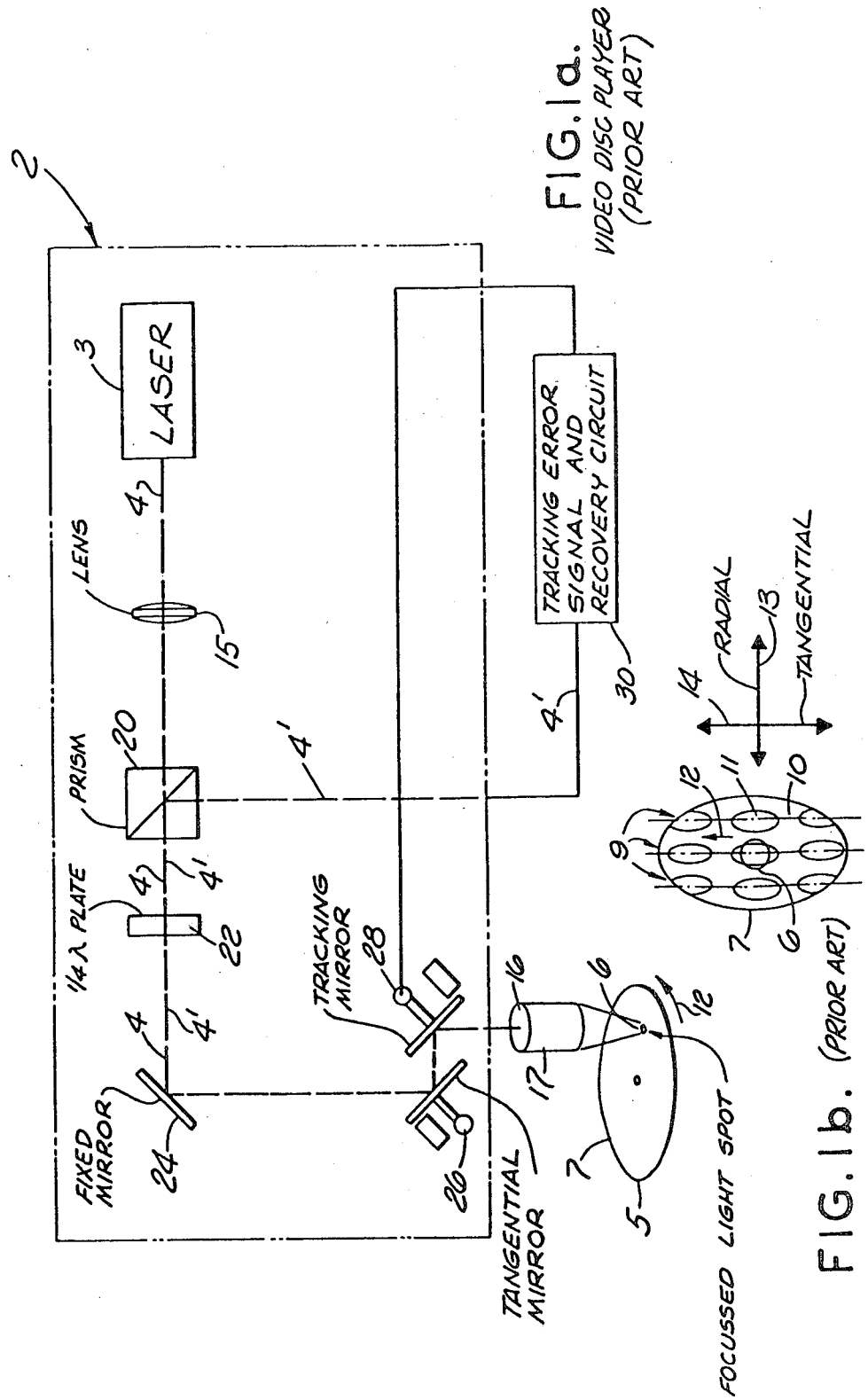

The same numeral is used in the several views to represent the same element.

Referring to FIG. 1a, there is shown a schmematic block diagram of an optical system 2 employed in a typical prior art video disc player system. The optical system 2 includes a read laser 3 employed for generating a read beam 4 which is used for reading a frequency modulated encoded signal stored on a video disc 5. The read beam 4 is polarized in a predetermined direction. The read beam 4 is directed to the video disc 5 by the optical system 2. An additional function of the optical system 2 is to image the light beam to a spot 6 at its point of impingement with the video disc 5.

An enlarged view of a portion of an information bearing surface 7 of the video disc 5 is shown in FIG. 1b. Each of a plurality of information tracks is generally indicated by a line 9 which is drawn through a plurality of successively positioned specular light reflective members 10 and non-specular light reflective members 11. One form of non-specular light reflectivity is light scattering of the type which occurs when the focused light beam 4 impinges upon a bump shaped member 11 carried upon a disc 5 which is rotating at a high rate of speed. The detailed description of these members 10 and 11 are given hereinafter. The clockwise direction of rotation of the disc 5 under the stationary read beam 4 is indicated by the head on an arrow 12. The read beam 4 has two degrees of movement, the first of which is in the radial direction as indicated by a double headed arrow 13. The second of which is the tangential direction as indicated by a double headed arrow 14. The double heads of each of the arrows 13 and 14 indicate that the read beam 4 can move in both directions in each of the radial directions and the tangential direction.

The optical system 2 further comprises a lens 15 employed for shaping the beam 4 to fully fill an entrance aperture 16 of a microscopic objective lens 17. The objective lens is employed for forming the spot 6 of light at its point of impingement with the regions 10 and 11 of the information track 9. Improved results have been found when the entrance aperture 16 is overfilled by the reading beam 4. This results in maximum light intensity at the spot 6.

After the beam 4 is properly formed by the lens 15, it passes through a beam splitting prism 20. The transmitted portion of the beam 4 is applied through a quarterwave plate 22 which provides a forty-five degree shift in polarization of the incident light forming the beam 4. The read beam 4 next impinges upon a fixed mirror 24 which redirects the read beam 4 to a first articulated mirror 26. The functions of the first articulated mirror 26 is to move the light beam in a first degree of motion which is tangential to the surface 7 of the video discs 5 to correct for time base errors introduced into the reading beam 4 because of eccentricities in the manufacture of the disc 5. The tangential direction is in the forward and/or backward direction along the information track 9 on the video disc 5 as indicated by the double headed arrow 14.

The first articulated mirror 26 directs the light beam to a second articulated mirror 28. The second articulated mirror 28 is employed as a radial tracking mirror. It is the function of the tracking mirror 28 to respond to a composite tracking error signal by slightly changing its physical position with relation to the read beam 4 to control the point of impingement 6 of the read beam 4 for radially tracking the information members 10 and 11 along a single information track 9. The second articulated mirror 28 has one degree of movement which moves the light beam in a radial direction over the surface of the disc 5 in the direction indicated by the double headed arrow 13. The read beam 4 now impinges upon the entrance aperture 16, as previously described, and is focused to a spot 6 upon the information track 9 of the video disc 5 by the lens 17.

In the normal playing mode, the focused beam of light impinges upon successively positioned specular light reflective regions 10 and non-specular light reflective members 11 representing the frequency modulated information. In the preferred embodiment, the non-specular reflective members 11 are light scattering elements carried by the video disc 5. The reflected beam 4' is a modulated light beam and the reflected beam is identified at 4'. The modulated reflected beam 4' is a light equivalent of the frequency modulated signal represented by the specular light reflective and non-specular light reflective members 10 and 11 positioned in the track 9. This modulated light beam is gathered by the microscopic objective lens 17 as it is reflected from the successively positioned members 10 and 11 on the video disc 5. The reflected read beam 4' retraces a portion of the same path previously described for the impinging read beam 4. This path includes sequential reflection from the second articulated mirror 28, the first articulated mirror 26, and the fixed mirror 24. This common path in the read optical system 2 is identified by using both the numeral 4 for the incident light beam and the numeral 4' for the reflected beam. The reflected read beam 4' next passes through the quarterwave plate 22. The quarterwave plate 22 provides an additional forty-five degree polarization shift resulting in a total of ninety degree shift in polarization of the reflected read beam 4' with respect to the incident read beam 4. The reflected read beam 4' now impinges upon the beam splitting prism 20, which prism diverts the ninety degree phase shifted reflected read beam 4' to impinge upon a tracking error signal recovery circuit indicated generally at 30. The circuit 30 generated the radial tracking error signal identified hereinafter.

Figure 2:
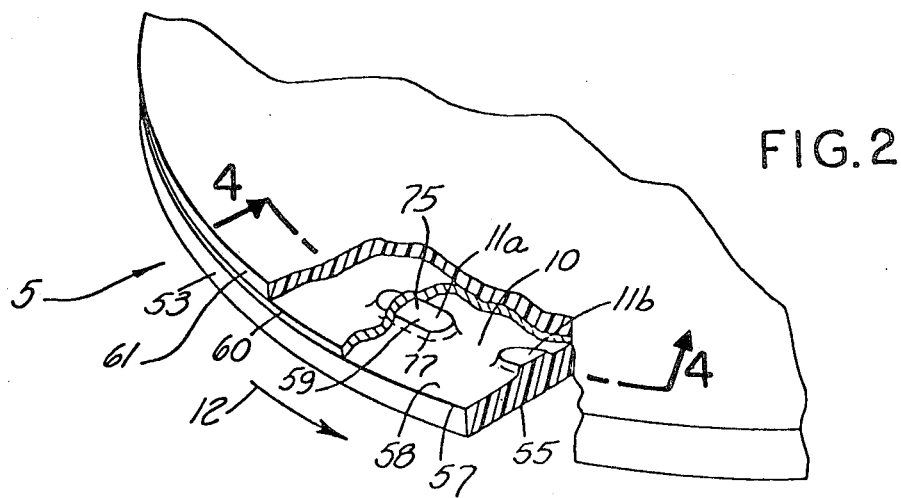

Referring to FIG. 2, there is shown a partial sectional and perspective view of a video disc member 5. The video disc 5 includes a substrate member 53 having a first or entrance surface at 55 and a second or information bearing surface 57. The second upper surface 57 includes a planar-shaped surface portion 58 which includes segments 10 which function as the specular light reflective portion of an information track 9. The upper surface 57 further includes non-planar shaped surface regions 59 which function as the non-specular light reflective members 11 of an information track. Each of the specular light reflective segments 10 is positioned between a pair of non-specular light reflective regions such as 11a and 11b.

A highly reflective layer 60 is formed over the surface 57 and a protective coating 61 is formed over the highly reflective layer 60. The preferred material for the layer 60 is a metal which also acts as a vapor barrier.

Figure 3:
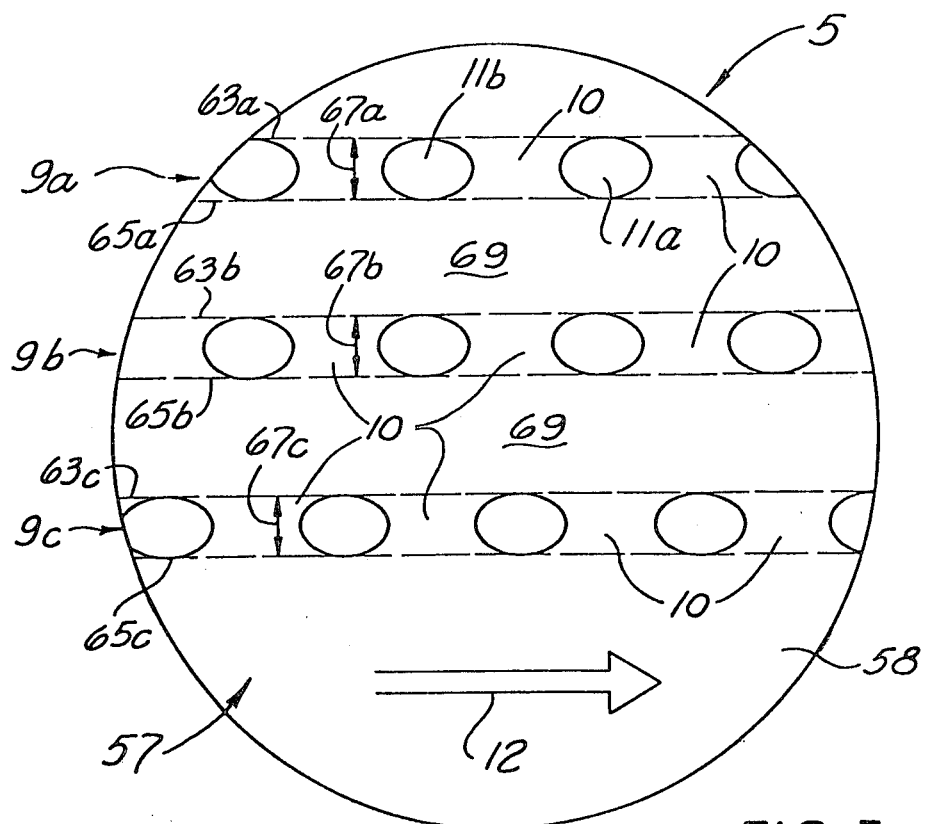

Referring to FIG. 3, there is shown a schematic view of a portion of the information bearing surface 57, including a plurality of tracks 9a, 9b and 9c. Each of the information tracks is a ring-shaped area lying between pairs of construction lines 63 and 65. Track 9a is generally lying between pairs of construction lines 63a and 65a, track 9b is generally lying between construction lines 63b and 65b, and track 9c is generally lying between construction lines 63c and 65c. The individual ring-shaped tracks are formed in a continuous spiral-shaped information track.

The width of each of the ring-shaped areas 9a, 9b and 9c is in the radial direction and this width dimension is indicated by the length of a line 67a, 67b and 67c, respectively. The length of the ring-shaped areas 9a, 9b, and 9c is in the circumferential direction and varies according to the radius of the ring-shaped member according to the well known formula $2\pi R$.

The planar-shaped portion 58 of the information storage surface 57 further includes planar-shaped inter-track guard regions 69 for separating adjacent tracks such as 9a and 9b. In this top view of an information track such as 9a, the specular reflective regions are shown as 10 and the non-specular reflective regions are shown in 11. In the embodiment shown in FIGS. 2 and 4, the non-specular light reflective regions 11 are shown as trapezoidal in cross-section having a leading edge 71 and a trailing edge 73, and a planar-shaped upper surface in the form of an oval. As shown in FIG. 2, region 11, having the trapezoidal cross-section, is shown as a frustum of an oval cone, having its surface 59 including an oval-shaped upper surface 75 and a side surface 77.

Figure 4:
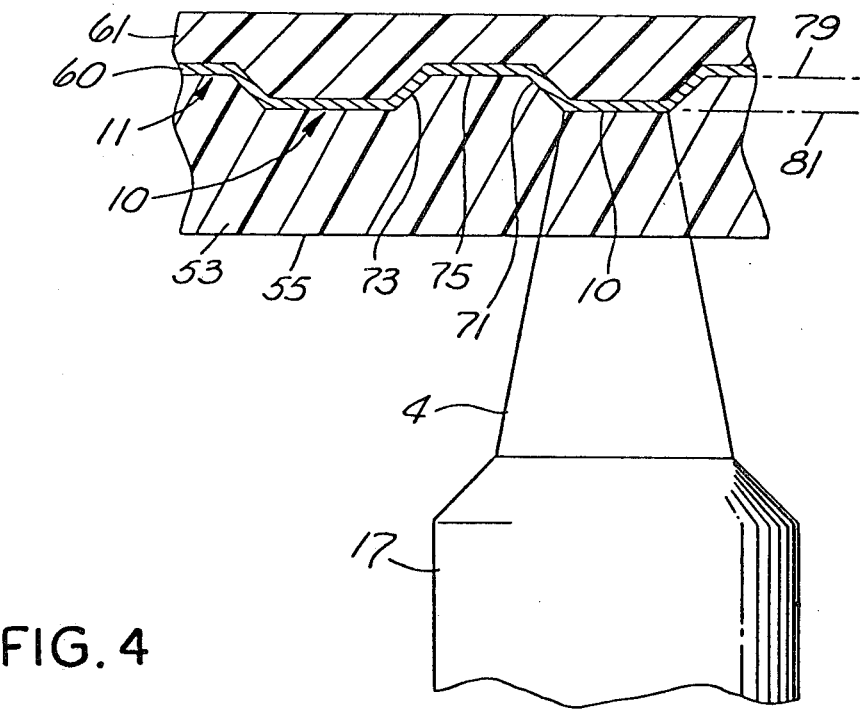

Referring to FIG. 4 alone, the upper surfaces 75 of each of the members 11 is shown terminated in a single plane indicated by a line 79. Each of the regions 10 is shown terminated in a single plane indicated by a line 81. The highly reflective layer 60 is covered with the protective layer 61. By observation, it can be noted that the protective layer 61 is substantially thinner than the substrate body 53. The objective lens, shown in side elevation, images the read beam 4 upon a light reflective region 10.

Figure 5:
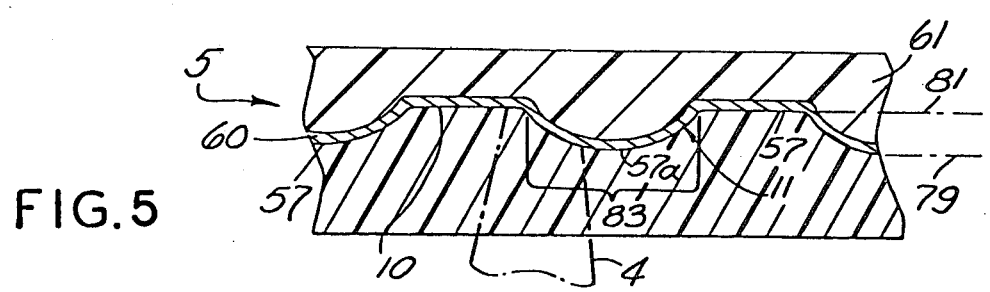
FIG. 5 is a radial cross-sectional view illustrating a further embodiment of a suitable video disc structure.

Referring to FIG. 5, there is shown a substantially identical cross-sectional view of a video disc structure 5 except that the non-specular light reflective region 11 is shown as a depression from the surface 57 and is represented as a semicircular line 57a lying between the brackets 83. In a perspective view (not shown), the depression is seen as a hemisphere-shaped void in the surface 57. The read beam 4 is shown imaged in part upon a specular light reflective region 10 and a non-specular light reflective region 11.

Figure 6:
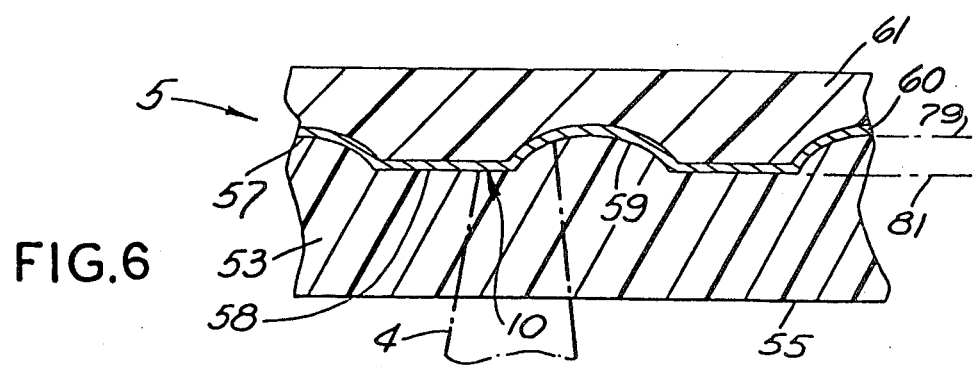
FIG. 6 is a radial cross-sectional view illustrating a still further embodiment of a suitable video disc structure.

Referring to FIG. 6, there is shown a third embodiment of a video disc structure 5 suitable for use in the video disc player shown in FIG. 1. The substrate is shown at 53 having a first or entrance surface at 55 and a second or information bearing surface at 57. The specular light reflective regions 10 are shown at 58. The non-specular light reflective regions 11 are shown as curved-shaped surface regions 59. The reflective layer 60 is formed over the upper surface 57. A protective layer 61 is shown formed over the reflective layer 60. The objective lens images the read beam 4 partially upon a planar-shaped specular light reflective portion 58 of the information bearing surface 57 and partially upon the curved-shaped portion 59 of the information bearing surface 57.

Figure 7:
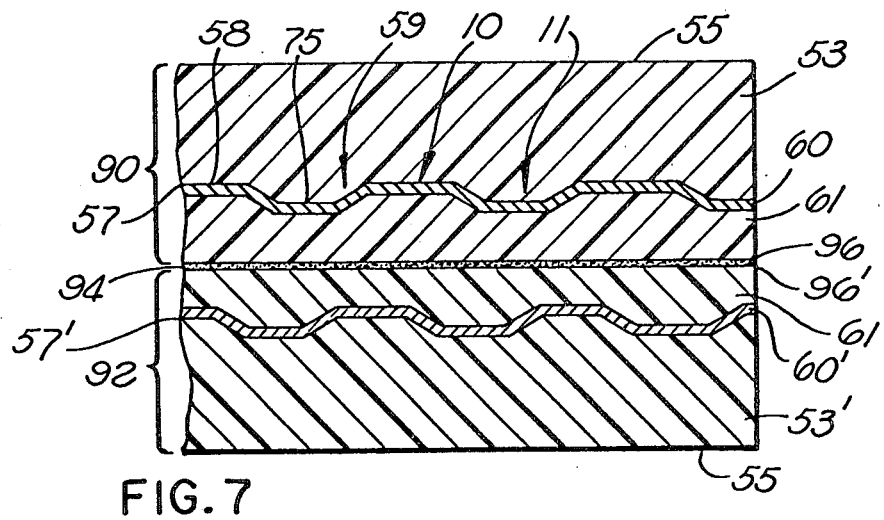
FIG. 7 shows a radial cross-sectional view of a disc structure being formed by bonding individual video disc structures together.

Referring to FIG. 7, there is shown a symmetrical composite video disc structure formed by the bonding together of two video disc members each having the configuration shown with reference to FIG. 4. A first video disc member is identified by a bracket 90 and a second video disc member is identified by bracket 92.

In the configuration shown with reference to FIG. 7, each of the video disc members 90 and 92 are semi-rigid and made according to the teachings set forth in the previously described Holmes application, Ser. No. 937,221, filed Aug. 28, 1978. The optical characteristics of the outer member 53 include being made of a material having a low and uniform value of birefringence. As shown with reference to FIG. 4, the reading beam 4 penetrates the outer member 53 prior to impinging upon the reflective coating 60. The protective coating 61 covers the reflective layer 60. The substrate portion 53 of the first video disc member 90 includes an information bearing surface 57 which includes a plurality of information tracks such as 9. Each such track 9 comprises successively positioned specular light reflective regions 10 and non-specular light reflective regions 11.

A layer of light reflective material 60, such as aluminum, is formed over the information bearing surface 57. A protective coating 61 is formed over the reflective layer 60. For best results, it has been found through experiment that the substrate 53 comprise more than fifty percent of the total bulk of the member 90. This feature, in combination with the metal layer 60, eliminates differential moisture absorption which otherwise causes curling or warping of the video disc member 90.

The second video disc member 92, comprises a substrate 53' having a second information bearing surface 57' formed with a plurality of information tracks such as 9. Each such track 9 comprises successively positioned specular light reflective regions 10' and non-specular light reflective regions 11'.

A layer of light reflective material 60', such as aluminum, is formed over the information bearing surface 57'. A protective coating 61' is formed over the reflective layer 60'. Again for best results, it has been found through experiment that the substrate 53' comprise more than fifty percent of the total bulk of the member 92.

In normal operating condition found in a home environment, the available moisture in the air enters the composite disc, shown in FIG. 7, through surfaces 55 and 55'. As previously mentioned, the members 53 and 53' each comprise over fifty percent of the total bulk of members 90 and 92, respectively. Any curling, warping or other distortion to member 53 caused by the absorption of water vapor is offset and/or neutralized by an equal and opposite curling, warping or other distortion in member 53'.

The first video disc member 90 is joined to the second video disc member 90 by joining means 94. The joining means 94 used in the embodiment shown in FIG. 7 is an adhesive substance identified as pliobond made by the Goodyear Company.

The adhesive is spread uniformly at a maximum thickness over outer surfaces 96 and 96' of the first and second video disc members 90 and 92, respectively. Using a uniform application of pressure, the individual video disc structures 90 and 92 are bonded together into the composite structure shown in FIG. 7.

In review, the composite structure shown in FIG. 7 comprises a first video disc member 90 carrying a first information surface 57 formed to include a plurality of information tracks and each track comprises first regions 10 employed for the specular reflection of an impinging read beam and non-planar regions 11 employed for the non-specular light reflection of the impinging read beam. The first and second metal layers 60 and 60' provide a vapor barrier against a differential moisture absorption between regions 53 and 61 and between regions 53' and 61', respectively. Any distortion of the upper substrate member 53 due to vapor absorption is counteracted by an equal and opposite distortion in the lower substrate member 53'.

Figure 8:
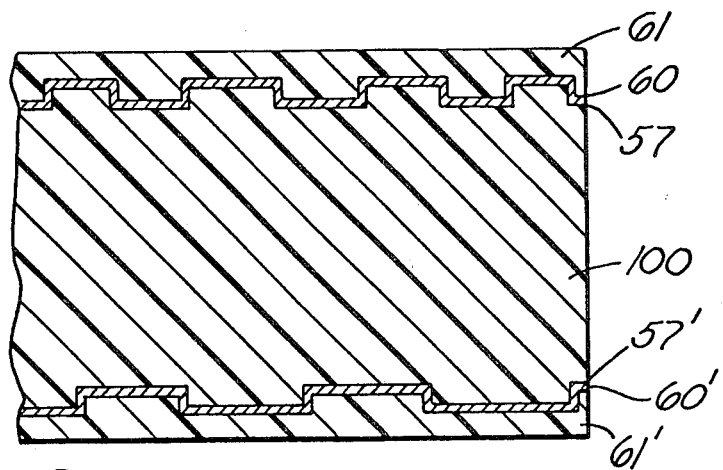
FIG. 8 shows a radial cross-sectional view of a symmetrical composite video disc structure formed by employing a single substrate member having information bearing surfaces formed on each major surface.

Referring to FIG. 8, there is shown a second embodiment for a symmetrical composite video structure employing an injection molded core member 100 having a first information bearing surface 57 and a second information bearing surface 57'. This member 100 comprises substantially the bulk of the composite structure. The injection molding of such a relatively thick member 100 provides a difficult structure manufacture by injection molding techniques, but gains the advantage of avoiding the use of relatively thick optical members such as 53 and 53' shown in FIG. 7. In the embodiment shown in FIG. 8, the information bearing surface 57 and 57' are covered by reflective layers 60 and 60', respectively. A protective overcoat 61 and 61' are formed over the metallic reflective layers 60 and 61', respectively.

In this configuration the substrate 100 need not be made from optically pure materials having low and uniform values of birefringence as previously described but rather need only be made from material having flow characteristics such as to be easily injected molded for faithfully reproducing the small regions 10 and 11 which form a part of the information bearing surfaces 57 and 57', respectively.

Referring to FIG. 9, there is shown a further embodiment of a symmetrical composite video disc structure formed with a first substrate member 53 having a information bearing surface 57. The information bearing surface 57 is covered with a reflective layer 60. The protective layer 61 is formed thereover. A cast, preformed member 102, separates the first video disc member 90 from the second video disc member 92. In this embodiment the joining means 94 comprises a central core member 102 having first and second surfaces 104 and 106 uniformly covered with the adhesive previously described.

The second video disc member 92 includes a substrate 53' having an information bearing surface 57'. A reflective layer 60' is formed over the second information bearing surface 57'. The protective layer 61' covers the reflective layer 60'.

In this configuration the protective layers 61 and 61' are formed with an optically pure substance having a low and uniform value of birefringence. The material from the substrate 53, 53' and 102 need be selected only for their injection molding characteristics as previously described with reference to substrate 100 shown in FIG. 8.

Referring to FIG. 10, there is shown a further embodiment of the present invention comprising a central core member 110 having a first information bearing surface 57 and a second information bearing surface 57'. The core member 110 is formed in an injection molding machine whereby both information bearing surfaces are formed simultaneously. Reflective layers 60 and 60' are formed over the information bearing layers 57 and 57', respectively. An optically clear layer 61 of low uniform value of birefringence is formed over the reflective layer 60. A second optically clear layer 61' of low and uniform value of birefringence is formed over the reflective layer 60'.

In this embodiment the reflective layers 60 and 60' provide a vapor barrier for avoiding differential moisture absorption between the central core member 110 and each of the protective coatings 61 and 61', respectively. Any distortion of the member 61 is counteracted by a similar and opposite distortion in the member 61'.

A particular problem facing injected molded products in general and injection molded video disc members in particular, is the effect of forming an injection molded video disc having a spin imbalance about its central axis. This spin imbalance is caused by an imperfect injection molding step whereby the material distribution results in portions of the video disc member being formed having a density or thickness greater in one region when compared to the density or thickness in a second region. This is an effect similar to an automobile tire being out of balance which requires the addition of individual weights added to the wheel to bring the entire wheel into balance when rotated about its axis.

Referring to FIGS. 12, 13 and 14, these are shown schematic representations of a video disc member having individual imbalance vectors. FIG. 12 shows a video disc member such as 90, having an imbalance vector represented by a single headed arrow 116. The length of the arrow 116 represents the magnitude of the imbalance vector and its direction represents the side of the video disc member 90 having the greater density or thickness.

FIG. 13 shows a second video disc member such as 92 having a second imbalance vector represented by a line 118.

Referring to FIG. 13 there is shown the resulting imbalance vector achieved by adhesively bonding the video disc member 90, shown in FIG. 12, with the video disc member 92, shown in FIG. 13, after rotating one of the video disc members 180 degrees. In the embodiment shown with reference to FIG. 14, the video disc member 92 is rotated 180 degrees and adhesively bonded to the video disc member shown with reference to FIG. 12. The imbalance vector 118 operates to reduce the resulting imbalance vector represented by a line 120 to the magnitude shown. This process provides means for saving a sufficiently high number of injection molded video disc members 90 which are found to fall outside acceptance specifications for imbalance. The playing of the video disc member 90, having a large imbalance vector, results in excessive vibration. The excessive vibration exceeds the radial tracking capability available in video disc players as illustrated in FIG. 1a.

During the carrying out of the process described with reference to FIGS. 12-14, it has been found by experience that the resulting vector 120 should fall within an arc less than five degrees in width as represented by dotted lines 122 and 124, respectively.

The final step in the process for forming a composite video disc member using a plurality of individual elements is to limit the imbalance vector of the composite video disc member to below 1.5 Newtons. This limitation on the value of imbalance is critical to the proper operation of the video disc player because composite video disc members exceeding this value exhibit undue vibration and cannot be tracked in the radial direction.

Additional advantages achieved by use of the described composite video disc member is the provision of a video disc which is aerodynamically stable when spun at rotational speeds reaching 1,800 r.p.m. In such an aerodynamic environment, the composite video disc member herein described remains substantially unaffected by the air flow caused due to these rotational speeds. This aerodynamic stability results in the elimination of the need for a stabilization plate as is required in the prior art players using a less rigid video disc member. A composite video disc member as herein described results in a video disc member having a high inertia when compared with prior art video disc member. This reduces the tangential servo tracking requirements of available video disc players.

Figure 11:
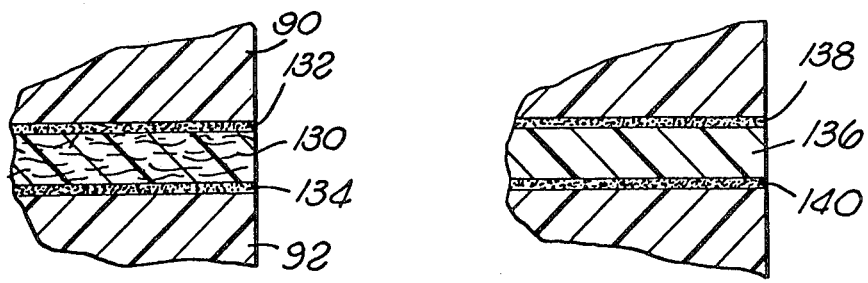
FIG. 11 shows a radial cross-sectional view of a composite video disc employing a rigid stiffening agent as part of the bond member.

Referring to FIG. 11, there is shown a cross-sectional view of a bonding member 94 shown with reference to FIG. 7. In this embodiment, a rigid bonding member 130 is shown positioned intermediate the first video disc member 90 and the second video disc member 92. A first uniform layer of adhesive is shown in 132 for adjoining the first video disc member 90 to the rigid member 130. A second layer of adhesive 134 is employed for joining the second video disc member 92 with the rigid insert member 130. A suitable rigid insert member 130 is identified as a stiff plastic sheet, or a fiberglass loaded ABS material.

The configuration shown with reference to FIG. 11 is a means for increasing the resistance to shear and for improving the resistance to warpage and curling caused by the absorption of moisture into the associated substrate member 53 and 53', respectively.

Figure 15:
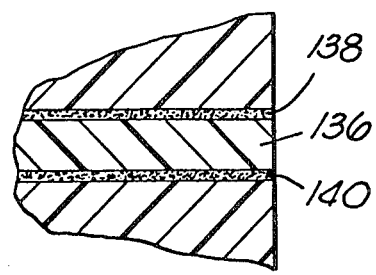
FIG. 15 shows the cross-sectional view of a composite video disc member employing a mylar web with adhesive carried on both sides as the means for forming the bond of a composite video disc member.

Referring to FIG. 15, there is shown a cross-sectional view of a further embodiment for the bonding means suitable for use in the present information. In this embodiment, a very thin flexible plastic member is shown at 136 having a first layer of adhesive shown at 138 and a second layer of adhesive shown at 140. In the preferred embodiment, the member 136 should be 12.5 microns in thickness. This embodiment is useful for the automated assembly of composite video disc members.

It is critical for the bonding means 94 to be as close to a no-shear bond as possible. This is achieved by using one of the plurality of techniques described. Additionally, the bond must be of uniform thickness for insuring that the information bearing surfaces of each member remains equidistant one from the other. If this equidistance relationship is not maintained, then the video disc member appears wedge-shaped when a cross-sectional view is through this region of variable thickness. The requirement for having the adhesive layer be of uniform thickness is based upon the focus and tracking limitations of the player with which such video disc members are used. The lens 17 achieves focus when spaced one (1) micron above the entrance surface 55 of the video member. Focus is maintained within a range of 0.3 microns. A focus servo is employed to keep the lens focused upon the information bearing surface 57. Accordingly, it has been found that the adhesive layer should be of uniform thickness for maintaining information bearing surfaces 57 and 57' equidistant one from the other to meet the focus and tracking requirements of the video disc player. A no-shear bond is achieved by using an adhesive layer less than 25 microns thick. In the event that the thickness of the bond exceeds 25 microns, a shear effect arises and the composite video disc member is no longer resistant to warping under adverse conditions of temperature and humidity. This renders the composite disc useless.

The adhesive is selected only to have a high shear strength. Any such high shear strength adhesive is suitable. Pliobond is the preferred adhesive.

The preferred plastic-like material for use as the information storage material includes a blend of polymethylmethacrylate (PMMA) and an impact modifier such as acrylic rubber as set forth in the Holmes application supra.

Other clear plastic mixtures or polyblends of the base resin PMMA polymethylmethacrylate useable in the present invention include: PVC (polyvinyl chloride) in its various molecular weights; polyvinylidine flouride (fluoro carbon) such as Kynar; Ionomers such as Surlyn; Styrene copolymers such as SAN (styrene acrylonitrile); liquid plasticizers such has DOP (dioctylphthalate) or DMP (dimethyl phthalate).

The base resin can also be changed, such as PVC. A family of impact modifiers useable with PVC include: ABS types (acrylonitrile butadiene styrene; acrylics (polymethyl methacrylate); CPE (chlorinated polyethylene); special copolyer such as ethylene-vinyl-acetate; liquid plasticicers (as above).

When the base resin is polystyrene, impact modification is enhanced by the addition of rubber such as elastomers eg polybutadiene and/or copolymer rubbers such as butadiene acrylonitrile.

With a polycarbonate base resin, polyblending materials include: polyesters, polycaprolactone, etc. and special copolymers eg BDS, butadiene styrene and methylmethacrylate-styrene.

Each of these plastic-like materials have low resistance to the absorption of water vapor because the molecular structure is relatively open and the water molecules easily enter the molecular structure. More specifically the water molecules are attracted to the molecular structure of these plastic-like materials.

The use of such materials give a product having values of birefringence which essentially remain flat when measured across the surfaces of the information storage member. Typically, values of birefringence vary between four (4) and twenty (20) nanometers.

Suitable materials for use as the protective layers as described hereinbefore include several different classes such as solvent dry or lacquer type materials, air dry or emulsion type materials, and ultraviolet or polymerization type materials.

The materials usable as the protective layers has the same low resistance to the absorption of water as described with reference to the material for use as the information storage member.

What is claimed is:

1. An information storage member of the type readable using the relative motion between the member and a continuous reading light beam for retrieving the information carried by the member, said information storage member comprising:
    a first disc-shaped information storage member formed of a plastic type material exhibiting a low and uniform value of birefringence and having a low resistance to the absorption of moisture;
    said first member having at least an entrance surface and an information bearing surface;
    said information bearing surface of said first member including as an integral portion thereof a spiral shaped information track formed from alternately positioned planar and non-planar regions;
    a reflective layer positioned upon said information bearing surface of said first member for providing a light reflective surface;
    a protective layer formed over said reflective layer and said protective layer having a low resistance to the absorption to moisture;
    said reflective layer also being moisture impervious for preventing differential moisture absorption between said first member and its respective protective layer;

said first member having a thickness greater than the combined thicknesses of said reflective and protective layers;

a second disc-shaped information storage member formed of a plastic type material having a low and uniform value of birefringence and having low resistance to the absorption of moisture;

said second member having an entrance surface and an information bearing surface, and said information bearing surface of said second member including as an integral portion thereof a spiral shaped information track formed from alternately positioned planar and non-planar regions;

a reflective layer positioned upon said information bearing surface of said second member for providing a light reflective surface;

a protective layer formed over said reflective layer and said protective layer having low resistance to the absorption of moisture;

said last mentioned reflective layer also being moisture impervious for preventing differential moisture absorption between said second member and said last mentioned protective layer;

said second member having a thickness greater than the combined thicknesses of said last-mentioned reflective and protective layers; and means for joining said protective layers with a high shear bond.

2. An information storage member structure comprising:

a first disc-shaped information storage member formed of a plastic material having a relatively low resistance to the absorption of moisture and carrying information on an information-bearing surface thereof;

a second disc-shaped information storage member formed of a plastic material having a relatively low resistance to the absorption of moisture and carrying information on an information-bearing surface thereof;

a thin, moisture impervious reflective layer overlying the information-bearing surface of each of said first and second information storage members;

a thin protective layer overlying each of said reflective layers;

each of said first and second information storage members having a thickness greater than the combined thicknesses of its corresponding reflective layer and protective layer; and means for joining together said protective layers in facing adjacent relationship, to form said storage member structure.

* * * * *

UNITED STATES PATENT AND TRADEMARK OFFICE
CERTIFICATE OF CORRECTION

PATENT NO. : 4,441,179
DATED : April 3, 1984
INVENTOR(S) : GARY G. SLATEN

It is certified that error appears in the above-identified patent and that said Letters Patent is hereby corrected as shown below:

Title page: Terminal Disclaimer Notice [*], after "Jan. 12" delete "1998" and insert --1999--.

Signed and Sealed this

First Day of October, 1991

Attest:

HARRY F. MANBECK, JR.

*Attesting Officer*   *Commissioner of Patents and Trademarks*